(12) United States Patent
Johnson et al.

(10) Patent No.: US 12,197,950 B2
(45) Date of Patent: *Jan. 14, 2025

(54) CLUSTER JOB SUBMISSION

(71) Applicant: Stripe, Inc., San Francisco, CA (US)

(72) Inventors: Andrew Johnson, Cleveland, OH (US);
Daniel Snitkovskiy, Renton, WA (US);
Marti Motoyama, San Francisco, CA
(US); Jonathan Bender, Oakland, CA
(US)

(73) Assignee: Stripe, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,566

(22) Filed: Jun. 15, 2023

(65) Prior Publication Data
US 2023/0325238 A1    Oct. 12, 2023

Related U.S. Application Data

(63) Continuation of application No. 16/917,616, filed on Jun. 30, 2020, now Pat. No. 11,748,161.

(51) Int. Cl.
*G06F 9/50* (2006.01)
*G06F 9/455* (2018.01)
(Continued)

(52) U.S. Cl.
CPC ............ *G06F 9/5005* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS 11,134,013 B1    9/2021  Allen et al.
2009/0089809 A1  4/2009  Deshpande et al.
(Continued)

FOREIGN PATENT DOCUMENTS

KR    1020180024367 A    3/2018

OTHER PUBLICATIONS

International Search Report and Written Opinion on the Patentability of Application No. PCT/US2021/039240 Mailed Oct. 8, 2021, 11 pages.
(Continued)

*Primary Examiner* — Charles M Swift
(74) *Attorney, Agent, or Firm* — BAKERHOSTETLER

(57) ABSTRACT

A method and apparatus for job submission are described. In one embodiment, the jobs are submitted by a job submission service or gateway that schedules large-scale data processing jobs on remote infrastructure. In one embodiment, the method comprises: receiving a request at a proxy service from a client, via a network communication, to submit a job to a cluster; and managing the job externally to the client, including sending a request to an orchestration system to launch an orchestration system job in a container to start the job running on the cluster via a client process run on a job client in the container and provide state information back to the proxy service regarding the orchestration system job.

20 Claims, 8 Drawing Sheets

(51) Int. Cl.
*G06F 9/48* (2006.01)
*G06Q 40/02* (2023.01)
*H04L 67/56* (2022.01)
*G06Q 20/02* (2012.01)
*G06Q 20/38* (2012.01)
*G06Q 20/40* (2012.01)

(52) U.S. Cl.
CPC ............ *G06F 9/45558* (2013.01); *G06F 9/48* (2013.01); *G06F 9/4806* (2013.01); *G06F 9/4843* (2013.01); *G06F 9/485* (2013.01); *G06F 9/4881* (2013.01); *G06F 9/50* (2013.01); *G06F 9/5027* (2013.01); *G06F 9/5061* (2013.01); *G06F 9/5072* (2013.01); *G06F 9/5077* (2013.01); *G06Q 40/02* (2013.01); *H04L 67/56* (2022.05); *G06F 2009/45562* (2013.01); *G06F 2009/4557* (2013.01); *G06F 2009/45575* (2013.01); *G06F 2209/505* (2013.01); *G06Q 20/023* (2013.01); *G06Q 20/385* (2013.01); *G06Q 20/40* (2013.01)

(58) Field of Classification Search
CPC ... G06F 2009/4557; G06F 2009/45575; G06F 9/48; G06F 9/4806; G06F 9/4843; G06F 9/485; G06F 9/4881; G06F 9/50; G06F 9/5005; G06F 9/5027; G06F 9/5061; G06F 9/5072; G06F 9/5077
See application file for complete search history.

(56) References Cited

U.S. PATENT DOCUMENTS

| | | | |
|---|---|---|---|
| 2009/0204980 A1* | 8/2009 | Sandoval | G06F 9/4812 719/328 |
| 2009/0241117 A1 | 9/2009 | Dasgupta et al. | |
| 2015/0264122 A1 | 9/2015 | Shau et al. | |
| 2017/0016084 A1 | 1/2017 | Chin et al. | |
| 2017/0061143 A1 | 3/2017 | Rooney et al. | |
| 2018/0181436 A1 | 6/2018 | Chen | |
| 2018/0219877 A1 | 8/2018 | Hsu et al. | |
| 2018/0247648 A1* | 8/2018 | Nadimpalli | G10L 15/22 |
| 2019/0108049 A1 | 4/2019 | Singh et al. | |
| 2021/0271489 A1 | 9/2021 | Singhal | |

OTHER PUBLICATIONS

International Preliminary Report and Written Opinion on the Patentability of Application No. PCT/US2021/039240 Mailed Jan. 12, 2023, 6 pages.

Extended European Search Report from European Patent Application No. 21832122.2, dated Jun. 13, 2024, 7 pages.

* cited by examiner

```
┌─────────────────────────────────────────────────────────────────────┐
│ Receive a request at a proxy service from a first client, via a    │
│ first network communication, to submit a first job to a cluster     │
│                              801                                    │
└─────────────────────────────────────────────────────────────────────┘
                                  ↓
┌─────────────────────────────────────────────────────────────────────┐
│ Manage the first job externally to the first client, including     │
│ sending a request to an orchestration system to launch an          │
│ orchestration system job in a container to start the first job     │
│ running on the cluster via a client process run on a job client    │
│ in the container and provide state information back to the proxy   │
│ service regarding the orchestration system job                      │
│                              802                                    │
└─────────────────────────────────────────────────────────────────────┘
                                  ↓
┌─────────────────────────────────────────────────────────────────────┐
│ Receive a call back from the container with information indicating │
│ the orchestration system job is running                             │
│                              803                                    │
└─────────────────────────────────────────────────────────────────────┘
                                  ↓
┌─────────────────────────────────────────────────────────────────────┐
│ Receive one or more heartbeat messages from the container          │
│ indicating the orchestration system job is running while the       │
│ orchestration system job runs                                       │
│                              804                                    │
└─────────────────────────────────────────────────────────────────────┘
                                  ↓
┌─────────────────────────────────────────────────────────────────────┐
│ Receive one or more logs emitted by the job client;                │
│                              805                                    │
└─────────────────────────────────────────────────────────────────────┘
                                  ↓
┌─────────────────────────────────────────────────────────────────────┐
│ Store job identification information to identify the first job     │
│ and one or both of status and log information regarding the first  │
│ job produced by the job client in the container                     │
│                              806                                    │
└─────────────────────────────────────────────────────────────────────┘
                                  ↓
┌─────────────────────────────────────────────────────────────────────┐
│ Enable access, to the first client, to status and/or log           │
│ information regarding the first job produced by the job client in  │
│ the container                                                       │
│                              807                                    │
└─────────────────────────────────────────────────────────────────────┘
```

FIG. 8

CLUSTER JOB SUBMISSION

RELATED APPLICATIONS

This application is a continuation of U.S. patent application Ser. No. 16/917,616, filed Jun. 30, 2020, and the disclosure of the aforementioned application is incorporated by reference herein in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

Embodiments of the present invention relate to the field of systems for processing commercial transactions; more particularly, embodiments of the present invention relate to processing large data sets with jobs submitted to clusters of processing nodes.

BACKGROUND OF THE INVENTION

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

As part of performing payment processing services, there is a large amount of data that is produced. The data is often stored across many remotely located cloud-based storage devices or clusters of processing nodes. Often large data sets of the payment processing data undergo processing by running libraries (e.g., open source libraries), such as, for example, Apache Hadoop. A cluster running such a library would be referred to as a Hadoop cluster. In order to process the large data set, jobs are submitted to the Hadoop cluster. In this case, each job is typically a Java application of scripts that run on the data. Submitting Hadoop jobs may be done through a series of scripts that run locally on client instances. These scripts would parse arguments from the submitter, apply additional arguments or configuration, build the job if necessary, and finally submit the job directly to a collection of nodes or other processes running on one or more machines (e.g., virtual machine, physical machine) in a cluster. This would result in a client process for the job running on that instance for the duration of the job.

One problem associated with the process for submitting jobs is that as this batch processing infrastructure evolves it frequently becomes fragmented across different job types, different submission mechanisms, and even different code repositories, making it difficult or impossible to make changes that apply to all forms of job submission. In other words, fixing bugs that occurred in one path would have to be fixed again in another path later, which greatly increases the maintenance burden.

It could be necessary to build functionality that needed to cross all forms of job submission. If there were an existing central system for managing job submission, such as Apache Airflow, one could implement this functionality there. However, such implementations would only work for that platform and likely still would require custom logic for different types of submission.

SUMMARY

A method and apparatus for job submission are described. In one embodiment, the jobs are submitted by a job submission service or gateway that schedules large-scale data processing jobs on remote infrastructure. In one embodiment, the method comprises: receiving a request at a proxy service from a first client, via a first network communication, to submit a first job to a cluster; and managing the first job externally to the first client, including sending a request to an orchestration system to launch an orchestration system job in a container to start the first job running on the cluster via a client process run on a job client in the container and provide state information back to the proxy service regarding the orchestration system job.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 is a flow diagram of another embodiment of a process for performing a job.

DETAILED DESCRIPTION

Figure 1:
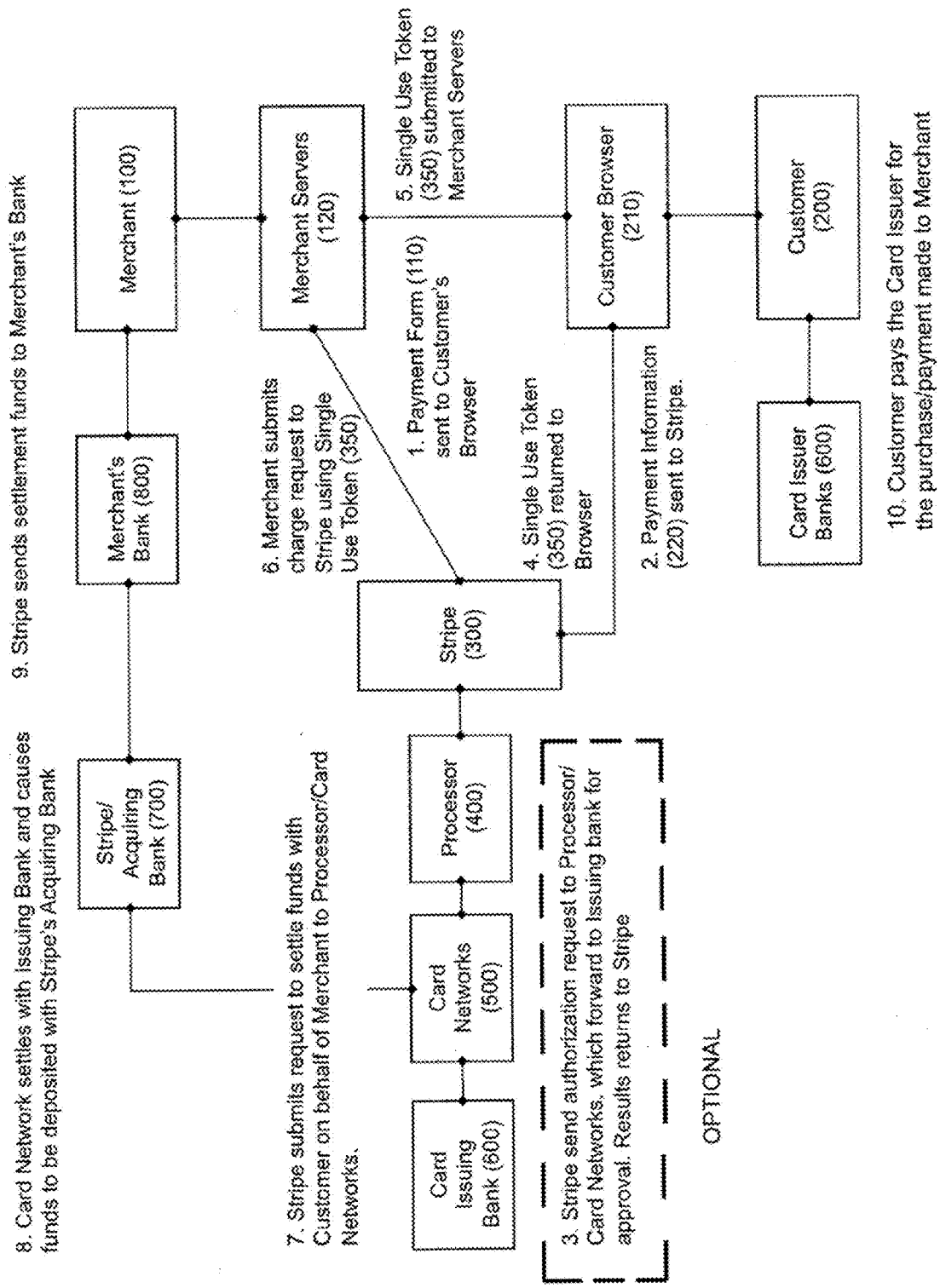
FIG. 1 shows a flow diagram of the steps and entities for implementing payment processing.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention are described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank— A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native application (app) installed onto the customer's device. The client-side application executes on the customer's electronic device.

Payment Processor—A payment processor, as referred to herein, is an entity or a plurality of entities that facilitate a transaction between a merchant and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830,596, and 9,824,354. The Processor (400)/Card Networks (500) is involved in authorizing or validating payment information. In one embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for abstracting and managing job submission (e.g., batch job submission) to clusters. In one embodiment, the job submissions are batch job submissions and the clusters are Hadoop clusters. However, the techniques disclosed herein are not limited to the submission of batch jobs and the use of Hadoop clusters.

In one embodiment, the jobs are run on datasets with data related to financial transactions that involve payment processing. For example, the data may be associated with payment transactions in which a payment processor handles payment processing and coordinates the payment processing flow.

FIG. 1 shows a flow diagram of the steps and entities for implementing payment processing flow embodiments of the present invention.

At a high level, the payment processing framework described herein works as follows (FIG. 1):

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Service Provider (100) (or to the Merchant's Bank (800)), net of any applicable fees.

10A. The Card Issuing Bank (600) collects the paid funds from the Customer (200).

Embodiments of the present invention may be operational with numerous general-purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

Overview of Submitting Jobs to Clusters

A process and apparatus for submitting jobs to a cluster are described. In one embodiment, the process involves the use of a service or job submission gateway as a proxy layer for job submission to a cluster. In one embodiment, the jobs are Hadoop jobs and they are submitted to a Hadoop cluster. In such a case, the service would act as a proxy layer for Hadoop job submission. In one embodiment, the service also handles non-Hadoop use cases, such as, for example, but not limited do, standalone Python jobs run through Airflow.

In one embodiment, the proxy layer service receives a request from a client to submit a first job to a cluster and manages the job externally from the client. This management includes sending a request to an orchestrator, or orchestration system (e.g., Kubernetes in one embodiment) to launch an orchestration system job in a container to start the job running on a cluster. In one embodiment, sending the request to the orchestration system to launch the orchestration system job comprises launching a container that encapsulates the job that the client requested the proxy layer service to submit. In one embodiment, the encapsulated job includes hooks for one or more operations for the cluster to perform.

In one embodiment, the container launched by the orchestration system causes a client process to run on a job client in the container. This container also provides state information back to the proxy layer service regarding the orchestration system job. In one embodiment, the proxy layer service also stores job identification information to identify the job submitted on behalf of the client and stores status and log information regarding produced by the container. The proxy layer service enables access by the client to status and/or log information regarding the job that the client requested the proxy layer service to submit.

In one embodiment, the techniques disclosed herein also allow a job submitted by the proxy layer service on behalf of the client to keep running even if a user of the client is disconnected, which may occur when the user shuts down their computer. Thus, even though submission of some jobs (e.g., a Hadoop job) requires a process that runs for the duration of the job and these jobs are often long running, there is no requirement to run jobs in a background process or a terminal multiplexer (e.g., tmux/screen) or other similar type of session.

Furthermore, in one embodiment, one may directly interact with the cluster (e.g., a Hadoop cluster) running the job (e.g., a Hadoop job). This is described in more detail below.

Figure 2:
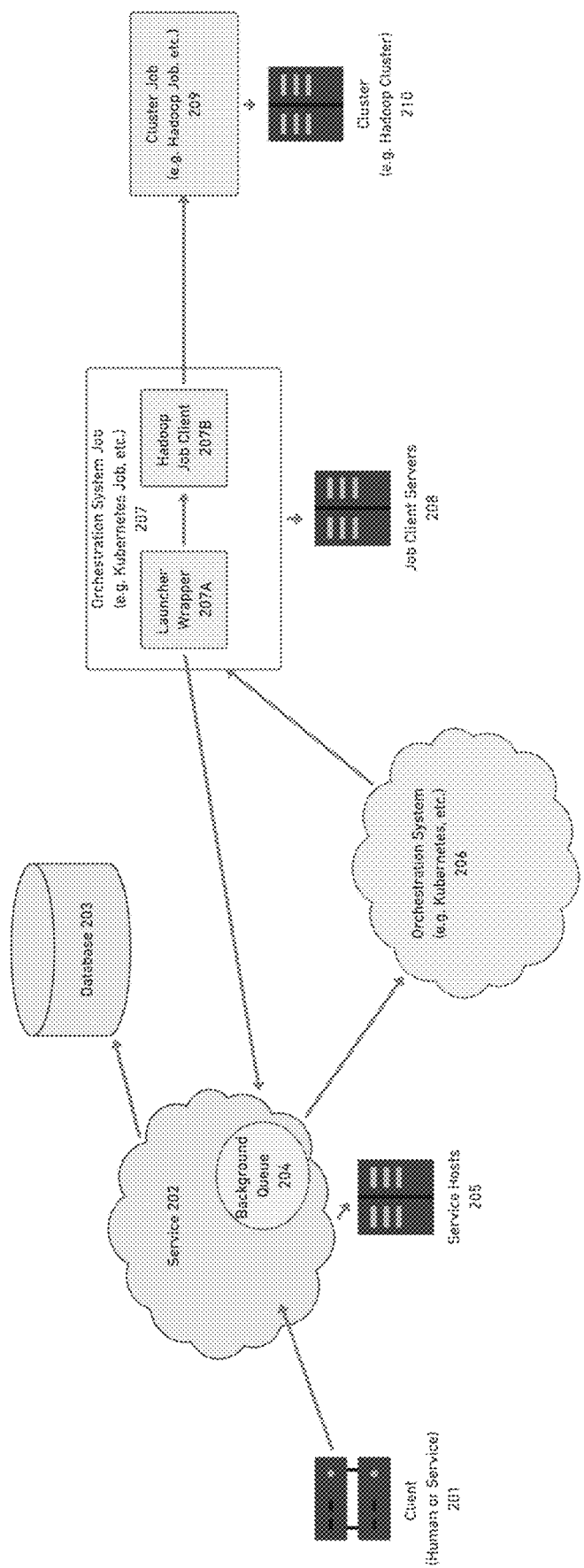
FIG. 2 is a data flow diagram illustrating the interaction between the components of a proxy layer service for submitting jobs.

FIG. 2 is a data flow diagram illustrating the interaction between the components of a proxy layer service for submitting jobs. Each flow is described in more detail below.

Referring to FIG. 2, clients, such as client 201, interact with proxy layer service 202. In one embodiment, proxy layer service 202 is a job submission gateway that schedules large-scale data processing jobs on remote infrastructure. In one embodiment, the interactions are through network communications via a network (e.g., Internet, etc.), which is not shown to avoid obscuring the present invention. In one embodiment, client 201 interacts with proxy layer service 202 via Hypertext Transfer Protocol (HTTP)-communications.

In one embodiment, proxy layer service 202 is a Go service running in Kubernetes on a service application security group (ASG) 205. In one embodiment, proxy layer service 202 uses a database 203 as a backing state store. In one embodiment, database 203 is a Postgres database but may be another database, such as, for example, but not limited to, a database in an Amazon Relational Database Service (RDS) instance). In one embodiment, proxy layer service 202 has a background queue system 204 to store work reliably across all instances of the service.

To submit a job, proxy layer service 202 makes a request to an orchestration system 206 to launch an orchestration system job 207. In one embodiment, the job submitted by proxy layer service 202 is a Hadoop job, and orchestration system 206 comprises Kubernetes and the Kubernetes master processes launches a Kubernetes job. In one embodiment, orchestration system job 207 (e.g., Kubernetes job) is launched in a container on the job client servers 208 and itself has two components: the launcher wrapper 207A and cluster job client 207B. In one embodiment, the job client servers 208 comprises a group of one or more servers in an AWS Auto-Scaling Group that are able to schedule work on a cluster.

The entry point for the container is the launcher wrapper 207A, which is a wrapper script that handles launching the actual job client 207B and also provides updates back to proxy layer service 202 about the state of orchestration system job 207 (e.g., Kubernetes job's state). When the wrapper script starts cluster job 210, a process for job 210 starts running in the container on cluster job client 207B, which communicates with cluster 210. Cluster 201 includes one or more nodes, where each node is a process running on a virtual or physical machine in the cluster. These machines have access to one or more database storage systems that store data sets upon which the job from client 201 is to be run. In one embodiment, cluster job client 207B comprises a Hadoop job client that communicates with a Hadoop cluster.

Proxy layer service 202 stores persistent state in database 203. In one embodiment, the data is stored in a database RDS instance with a plurality of core tables that include the following:

1) job_submission: Every job that is submitted has an entry in this table that stores a unique identifier for the job as well as metadata about the submission;
2) job_logs: All the logs produced by the Hadoop job client are stored here; and
3) hadoop_job: This stores a mapping between the unique identifier from job_submission and the Hadoop application id(s) for the Hadoop job. This mapping is used to move between the two identifiers, such as when killing a job.

Figure 3:
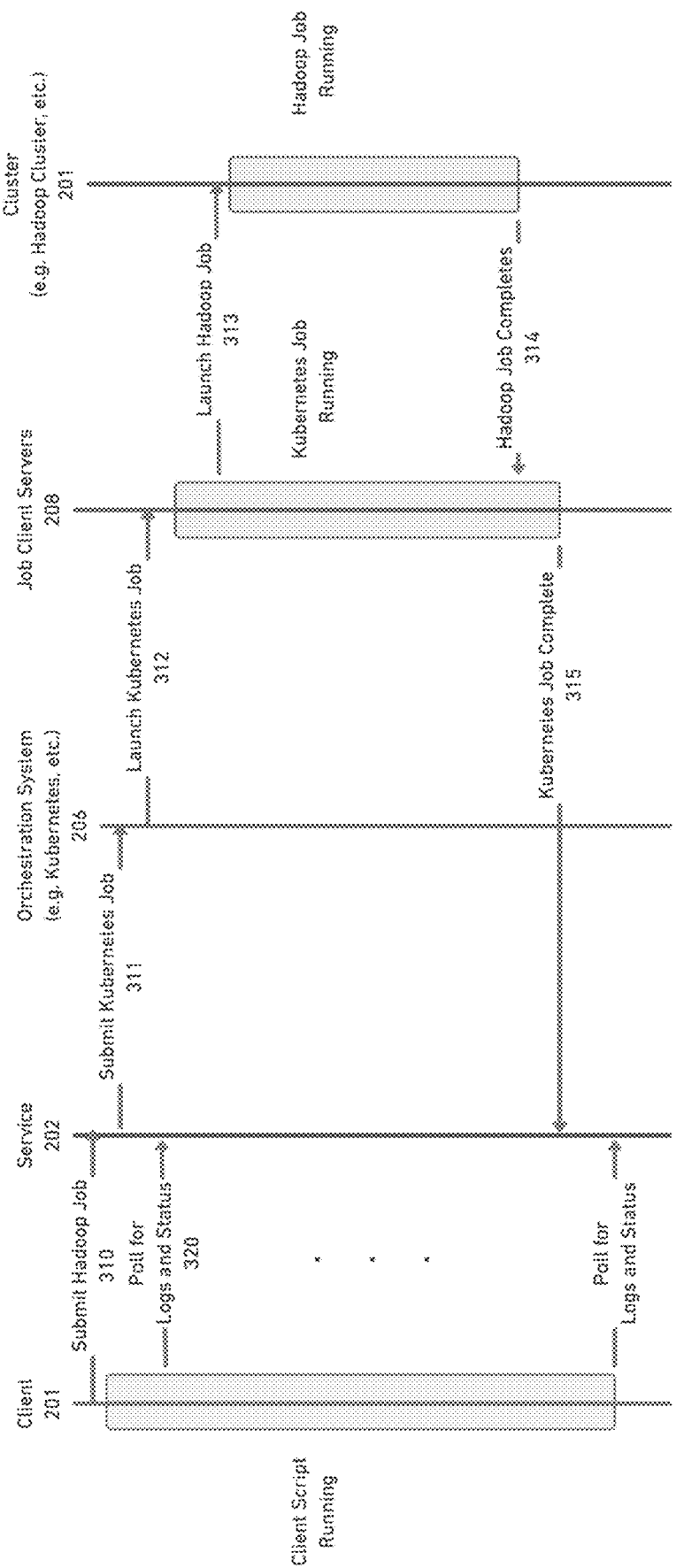
FIG. 3 displays a high-level sequence of operations when submitting a Hadoop job according to one embodiment.

FIG. 3 displays a high-level sequence of operations when submitting a Hadoop job according to one embodiment. The sequence of operations assumes that orchestration system 206 is a Kubernetes orchestration system and the cluster is a Hadoop cluster. Note that the techniques disclosed herein are not limited to those systems.

Referring to FIG. 3, client 201 submits a job by running an existing submission script.

When the client 201 script is running, client 201 makes a request to a job submission endpoint of proxy layer service 202 to submit a Hadoop job (310). This causes service 201 to submit a Kubernetes job to the Kubernetes master processes (orchestration system 206) (311) to cause orchestration system 206 to launch a new Kubernetes job (312) that will run the client for that job. In this case, the Kubernetes job runs on the job client servers 208. When the container for that Kubernetes job starts, it will launch the actual Hadoop job (313). At that point, the Hadoop job is running on cluster 210, which is a Hadoop cluster.

During the execution of the job, the client script polls job status and job log endpoints of proxy layer service 202 (320) to retrieve the status of the Kubernetes job and any logs produced by the client in the container. The retrieved logs may be printed to a terminal. In one embodiment, the polling and retrieval of status and/or logs continues to do this until proxy layer service 202 returns a terminal status for the Kubernetes job.

Cluster 210 signals the job client running on the job client servers 208 when the Hadoop job completes (314). In response thereto, the job client signals proxy layer service 202 that the Kubernetes job is complete (315).

Figure 4:
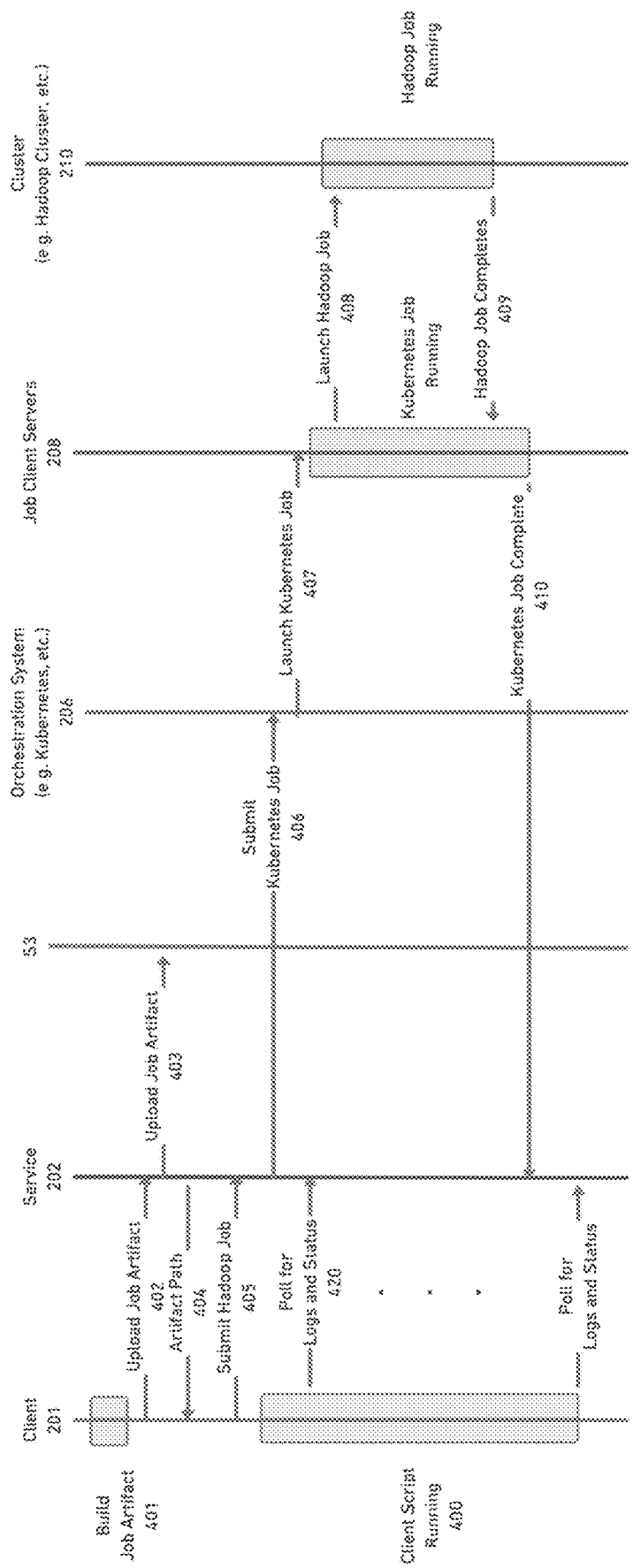
FIG. 4 illustrates a submission flow for production jobs according to one embodiment.

The flow described above is for Hadoop jobs where the necessary artifacts to run the job have been built in a continuous integration (CI) and deployed. In another embodiment, adhoc Hadoop jobs where a person runs a job on code that has not been committed or deployed may be performed. FIG. 4 illustrates a submission flow for production jobs with the addition of managing adhoc artifacts for the job. Referring to FIG. 4, the change is this case comes at the start of the client process. The client script runs (400) and first builds the artifact for the Hadoop job (401). When this completes, the client uploads the artifact to proxy layer service 202 via the/artifact endpoint (402), and proxy layer service 202 uploads this artifact to S3 (403) and returns the S3 path to the client (404). If the identical artifact already exists, no upload is performed.

The client script 400 now submits the Hadoop job to proxy layer service 202 (405) as in the production case, but instead of requesting that it run the job directly, the submission instead instructs Kubernetes to run a wrapper script inside the Kubernetes job container that downloads the artifact from the provided S3 path before launching the job.

Thereafter, the process is the same as the production case. That is, once service 201 submit a Kubernetes job to the Kubernetes master processes (orchestration system 206) (406), this causes orchestration system 206 to launch a new Kubernetes job (407) that will run the client for that job. In this case, the job client servers 208 runs the Kubernetes job. When the container for that Kubernetes job starts, the job client running on the job client servers 208 launches the actual Hadoop job (408). At that point, the Hadoop job is running on cluster 210, which is a Hadoop cluster.

During the execution of the job, the client script polls job status and job log endpoints of proxy layer service 202 (420) to retrieve the status of the Kubernetes job and any logs produced by the client in the container. The retrieved logs may be printed to a terminal. In one embodiment, the polling and retrieval of status and/or logs continues to do this until proxy layer service 202 returns a terminal status for the Kubernetes job.

Cluster 210 signals the job client running on the job client servers 208 when the Hadoop job completes (409). In response thereto, the job client signals proxy layer service 202 that the Kubernetes job is complete (410).

Figure 5:
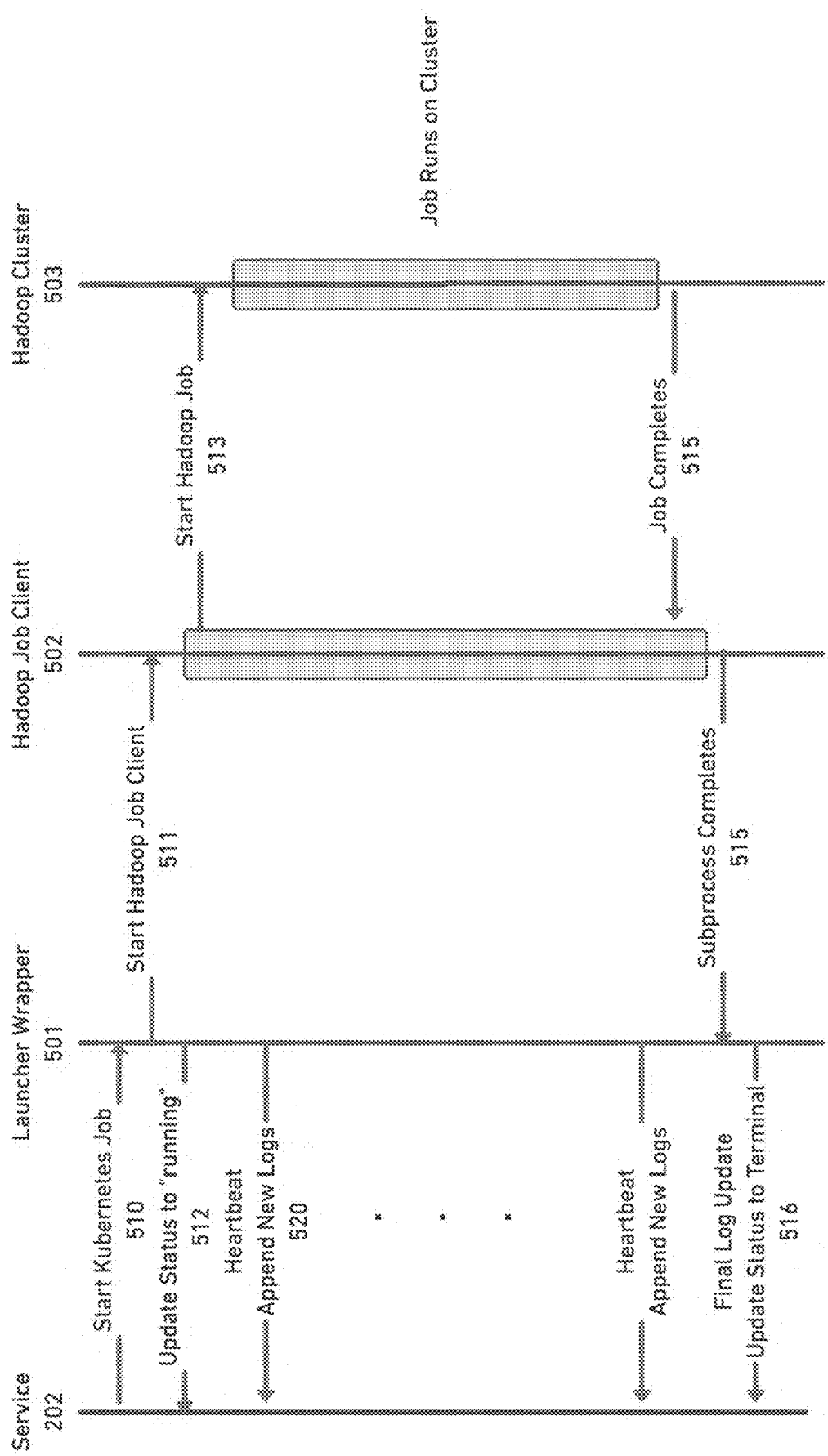
FIG. 5 illustrates a data flow diagram of a process for providing feedback about the job from a job client to a proxy layer service.

When submitting a Hadoop job, proxy layer service 202 is able to provide client 201 feedback about the status of the Hadoop job and any logs from the job client. These may be used for understanding its state and/or debugging. FIG. 5 illustrates a data flow diagram of a process for providing feedback about the job from the job client to proxy layer service 202.

Referring to FIG. 5, the process begins with proxy layer service 202 starting the Kubernetes job (510). When proxy layer service 202 starts a Kubernetes job, it marks the job as being in the pending state. In the Kubernetes job it launches a launcher wrapper 501 script that wraps launching the actual job client. When this launcher wrapper 501 script starts in the Kubernetes job container, it calls back to proxy layer service 202 to indicate that it is now in the running state (512). In one embodiment, launcher wrapper 501 performs the callback to an update job endpoint of proxy layer service 202. Then launcher wrapper 501 starts the Hadoop job client 502 (511) as a sub-process.

Hadoop job client 502 starts the Hadoop job (513) on Hadoop cluster 503, and the job runs on the cluster.

In one embodiment, while Hadoop job client sub-process is running, the launcher wrapper 501 periodically sends a heartbeat message back to proxy layer service 202 indicating it is still alive and running (520). In one embodiment, the launcher wrapper 501 sends the heartbeat messages to a heartbeat endpoint of proxy layer service 202. In one embodiment, launcher wrapper 501 also passes back any new logs that have been emitted by the Hadoop job client so that they can be appended into a job logs table. In one embodiment, the logs are sent to an update job endpoint of proxy layer service 202.

When the Hadoop job completes on Hadoop cluster 503, Hadoop cluster 503 sends an indication to Hadoop job client 502 (514). In response thereto, Hadoop job client 502 sends an indication to the launcher wrapper 501 that the client sub-process has completed (515).

Whether the Hadoop job client 502 successfully or not, the launcher wrapper 501 sees that its sub-process has terminated and sends a final update back to proxy layer service 202 with any last logs and indicates a terminal state (success or failed) (516). At this point, the launcher wrapper 501 exits and the Kubernetes job terminates.

In one embodiment, if a Kubernetes job gets into an unusual state and cannot properly indicate a terminal status to proxy layer service 202, to prevent clients from hanging indefinitely, proxy layer service 202 runs a task in its background work queue to kill Kubernetes jobs. In one embodiment, proxy layer service 202 kills the Kubernetes job when launcher wrapper 501 (of the Kubernetes job) hasn't sent a heartbeat in more than a predetermined number of minutes (e.g., 10 minutes, 15 minutes, etc.).

Note that there may be other reasons for killing Hadoop jobs that are running. In one embodiment, proxy layer service 202 supports killing running Hadoop jobs when a user(s) wants to stop running jobs for any reason. In one embedment, this is triggered by sending a terminal signal to the client script. In one embodiment, the termination signal sent to the client script is a generic signal used to cause program termination, such as, for example, but not limited to a SIGTERM signal, or a program interrupt signal, such as, for example, but not limited to, a SIGINT signal. In response to the termination signal, the client script calls a kill job endpoint of proxy layer service 202.

Figure 6:
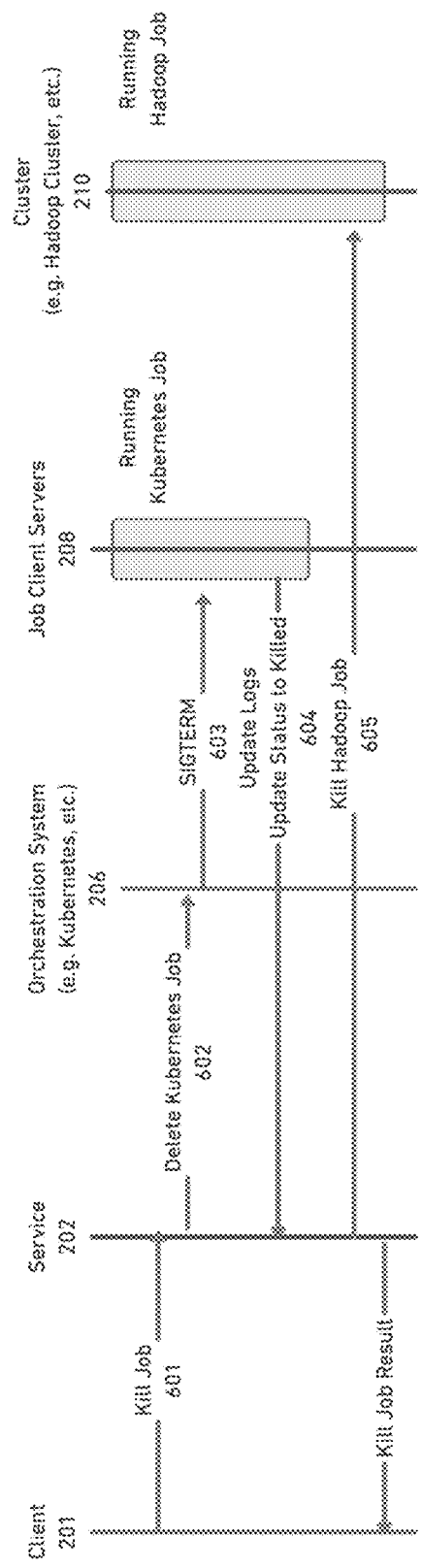
FIG. 6 is a data flow diagram illustrating killing a job according to one embodiment.

FIG. 6 is a data flow diagram illustrating killing a job according to one embodiment. Referring to FIG. 6, client 201 sends a kill job request to proxy layer service 202 (601). In response, proxy layer service 202 deletes the Kubernetes job with the Kubernetes master processes of orchestration system 206 (602). In one embodiment, this is done because it is the only way to send a signal to the running container.

The Kubernetes master processes of orchestration system 206 then sends a termination signal (e.g., SIGTERM) to the root process in the Kubernetes job container running on the job client servers 208 (603), which is the launcher wrapper script. The process propagates this signal onto its sub-process and then sends a final update of the logs and the killed status back to proxy layer service 202 (604).

In one embodiment, it is possible that the Hadoop jobs on the cluster do not exit when the Hadoop job client goes away, so proxy layer service 202 then kills all the Hadoop jobs directly on the cluster using the application identifiers (IDs) from a hadoop_job table maintained on its storage database (605). Once this is complete, it returns a result to client 201 indicating what jobs were killed (606).

Metadata Endpoints

In one embodiment, proxy layer service 202 provides endpoints to map between the unique identifier for a job submission (referred to herein as a "submission id") and the Hadoop application ids for a Hadoop job. In one embodiment, these endpoints are as follows:
  1) /hadoopjobs takes a submission id and returns a set of Hadoop application ids, and
  2) /submissionid takes a Hadoop cluster name and application id and returns a submission id.

These endpoints are useful for integrating proxy layer service 202 with other services. For example, a job tracker could use these endpoints to retrieve the submission id for Hadoop jobs that it is tracking and use this identifier to further integrate with the proxy layer service 202, such as for killing running jobs.

Job Modification Hooks

Figure 7:
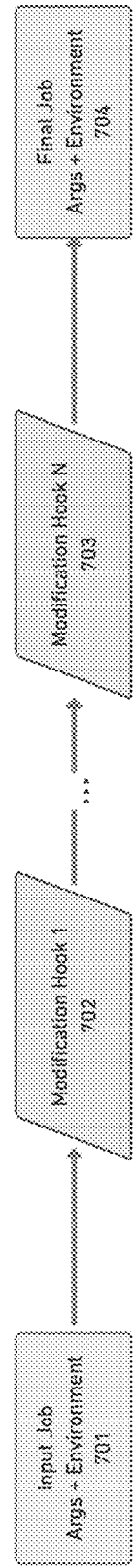
FIG. 7 illustrates use of job modification hooks according to one embodiment.

The proxy layer service 202 may wish to add or modify the behavior of jobs it submits, such as applying an access control check. To do so it applies a series of hooks to each job. In one embodiment, proxy layer service 202 sees the arguments and environment for the Hadoop jobs it submits, and these hooks can be used to modify one or more arguments and/or the environment. FIG. 7 illustrates the use of job modification hooks according to one embodiment. Referring to FIG. 7, the input arguments and environment 701 are passed in via a submit job endpoint and the final arguments and environment 704 are what proxy layer service 202 uses when constructing its request to start a Kubernetes job. One or more hooks, such as modification hook$_1$ 702 through modification hook$_N$ 703 may be included to modify the arguments and environment 701 to generate the final arguments and environment 704. Within these hooks, any necessary logic occurs.

Access control is an example of a more complex hook. In one embodiment, an access control hook looks at the user and inputs/outputs of a Hadoop job and then calls out to a library (e.g., an IAM library) to confirm that the user has access to that data that is going to be accessed for the job. In one embodiment, there may be code specifically included in a library to accompany a hook in proxy layer service 202.

An Example Job Submission and Completion Flow

FIG. 8 is a flow diagram of another embodiment of a process for performing a job. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 8, the process begins by processing logic receiving a request at a proxy service from a first client, via a first network communication, to submit a first job to a cluster (processing block 801). In one embodiment, the first job is a batch job. In one embodiment, the request is an HTTP request that is received via a network connection over a network (e.g., the Internet, etc.).

In response to the request, processing logic manages the first job externally to the first client (processing block 802). In one embodiment, managing the job includes sending a request to an orchestration system to launch an orchestration system job in a container to start the first job running on the cluster via a client process run on a job client in the container and provide state information back to the proxy service regarding the orchestration system job. In one embodiment, the cluster is a Hadoop cluster. In one embodiment, the orchestration system is Kubernetes.

In one embodiment, sending the request to the orchestration system to launch the orchestration system job comprises launching a container that encapsulates the first job. In one embodiment, the encapsulated job includes hooks for one or more operations for the cluster to perform.

While the first job is running, processing logic may optionally receive a call back from the container with information indicating the orchestration system job is running (processing block 803), one or more heartbeat messages from the container indicating the orchestration system job is running while the orchestration system job runs (processing block 804), and/or one or more logs emitted by the job client (processing block 805).

Processing logic also stores job identification information to identify the first job and one or both of status and log information regarding the first job produced by the job client in the container (processing block 806) and enables access, to the first client, to status and/or log information regarding the first job produced by the job client in the container (processing block 807).

An Example Computer System

Figure 9:
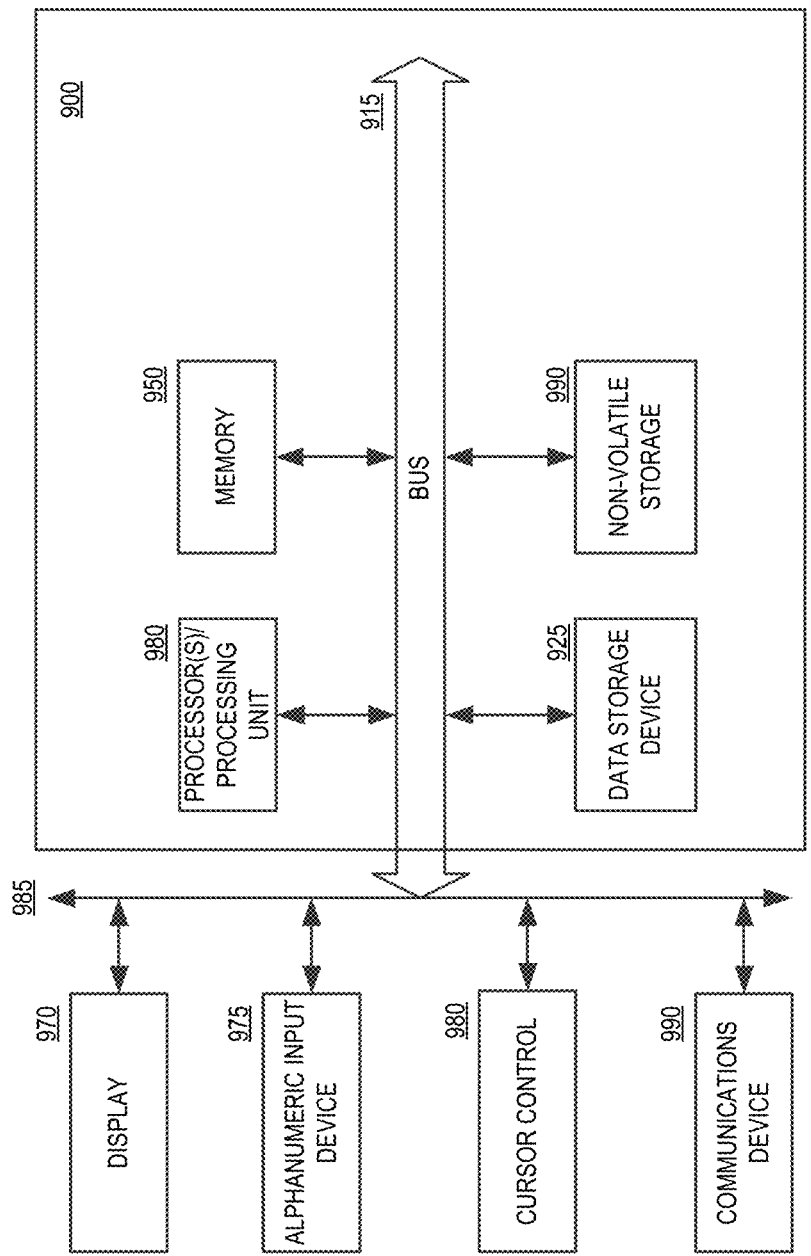
FIG. 9 is a block diagram of one embodiment of a computer system.

FIG. 9 is one embodiment of a computer system that may be used to support the systems and operations discussed herein. It will be apparent to those of ordinary skill in the art, however that other alternative systems of various system architectures may also be used.

The data processing system illustrated in FIG. 9 includes a bus or other internal communication means 915 for communicating information, and a processor(s) 910 coupled to the bus 915 for processing information. The system further comprises a random-access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor(s) 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a light emitting diode (LED) display or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a touchpad, mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments as discussed herein.

In one embodiment, processor(s) 910 executes one or more operations discussed above with respect to cluster job submission.

It will be appreciated by those of ordinary skill in the art that any configuration of the system may be used for various purposes according to the particular implementation. The control logic or software implementing the described embodiments can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The embodiments discussed herein may also be embodied in a handheld or portable device containing a subset of the computer hardware components described above. For example, the handheld device may be configured to contain only the bus 985, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method comprising receiving a request at a proxy service from a first client, via a first network communication, to submit a first job to a cluster; and managing the first job externally to the first client, including sending a request to an orchestration system to launch an orchestration system job in a container to start the first job running on the cluster via a client process run on a job client in the container and provide state information back to the proxy service regarding the orchestration system job.

Example 2 is the method of example 1 that may optionally include storing, under control of the proxy service, job identification information to identify the first job and one or both of status and log information regarding the first job produced by the job client in the container; and enabling access, to the first client, to status and/or log information regarding the first job produced by the job client in the container.

Example 3 is the method of example 1 that may optionally include receiving a call back from the container with information indicating the orchestration system job is running; receiving a heartbeat messages from the container indicating the orchestration system job is running; and receiving one or more logs emitted by the job client.

Example 4 is the method of example 1 that may optionally include that sending the request to the orchestration system to launch the orchestration system job comprises launching a container that encapsulates the first job.

Example 5 is the method of example 4 that may optionally include that the encapsulated job includes hooks for one or more operations for the cluster to perform.

Example 6 is the method of example 1 that may optionally include that the first job is a batch job.

Example 7 is the method of example 1 that may optionally include that the request is an HTTP request.

Example 8 is the method of example 1 that may optionally include that the cluster is a Hadoop cluster.

Example 9 is the method of example 1 that may optionally include that the orchestration system is Kubernetes.

Example 10 is a system comprising: a network interface to receive a request at a proxy service from a first client, via a first network communication, to submit a first job to a cluster; a memory to store instructions; one or more processors coupled to the memory and the network interface to execute the stored instructions to: manage the first job externally to the first client, including sending a request to an orchestration system to launch an orchestration system job in a container to start the first job running on the cluster via a client process run on a job client in the container and provide state information back to the proxy service regarding the orchestration system job.

Example 11 is the system of example 10 that may optionally include that the one or more processors are configured to: store, under control of the proxy service, job identification information to identify the first job and one or both of status and log information regarding the first job produced by the job client in the container; and enable access, to the first client, to status and/or log information regarding the first job produced by the job client in the container.

Example 12 is the system of example 10 that may optionally include that the network interface is operable to: receive a call back from the container with information indicating the orchestration system job is running; receive a heartbeat messages from the container indicating the orchestration system job is running; and receive one or more logs emitted by the job client.

Example 13 is the system of example 10 that may optionally include that the one or more processors send the request to the orchestration system to launch the orchestration system job by launching a container that encapsulates the first job.

Example 14 is the system of example 10 that may optionally include that the encapsulated job includes hooks for one or more operations for the cluster to perform.

Example 15 is the system of example 10 that may optionally include that the request is an HTTP request.

Example 16 is the system of example 10 that may optionally include that the cluster is a Hadoop cluster and the orchestration system is Kubernetes.

Example 17 is one or more non-transitory computer readable storage media having instructions stored thereupon which, when executed by a system having at least a processor and a memory therein, cause the system to perform operations comprising: receiving a request at a proxy service from a first client, via a first network communication, to submit a first job to a cluster; and managing the first job externally to the first client, including sending a request to an orchestration system to launch an orchestration system job in a container to start the first job running on the cluster via a client process run on a job client in the container and provide state information back to the proxy service regarding the orchestration system job.

Example 18 is the one or more non-transitory computer readable storage media of example 17 that may optionally include that the method further comprises: storing, under control of the proxy service, job identification information to identify the first job and one or both of status and log information regarding the first job produced by the job client in the container; and enabling access, to the first client, to status and/or log information regarding the first job produced by the job client in the container.

Example 19 is the one or more non-transitory computer readable storage media of example 17 that may optionally include that the method further comprises: receiving a call back from the container with information indicating the orchestration system job is running; receiving a heartbeat messages from the container indicating the orchestration system job is running; and receiving one or more logs emitted by the job client.

Example 20 is the one or more non-transitory computer readable storage media of example 17 that may optionally include that sending the request to the orchestration system to launch the orchestration system job comprises launching a container that encapsulates the first job.

Example 21 is the one or more non-transitory computer readable storage media of example 20 that may optionally include that the encapsulated job includes hooks for one or more operations for the cluster to perform.

Example 22 is the one or more non-transitory computer readable storage media of example 17 that may optionally include that the first job is a batch job, the request is an HTTP request, the cluster is a Hadoop cluster, and the orchestration system is Kubernetes.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving, at a proxy service, a request to submit a job to a cluster
   sending, by the proxy service, the request to an orchestration system;
   causing the orchestration system to launch an orchestration system job in a container on a job client server, wherein the job client server is separate from the cluster and the proxy service, the orchestration system job to start the job on the cluster, the orchestration system job comprising:
   a job client; and
   a launcher wrapper to launch the job client on the job client server;
   storing, in a database under control of the proxy service, a job identifier associated with the job and a cluster identifier associated with the cluster;
   receiving state information regarding the orchestration system job sent by the launcher wrapper to the proxy service for storage in the database with the job identifier associated with the job and the cluster identifier associated with the cluster;
   receiving, by the proxy service, a kill request to terminate the job; and
   terminating, by the proxy service, the job using the job identifier stored in the database without proceeding through the orchestration system.

2. The method defined in claim 1, wherein the request includes a set of modification hooks, wherein the set of modification hooks are provided via a submit job endpoint for modifying, by the proxy service, the request based on the modification hooks, the modifying comprising at least one of:
  a set of arguments associated with the job; or
  an execution environment associated with the job.

3. The method defined in claim 2 wherein one of the set of modification hooks is an access control hook, wherein the access control hook:
  obtains a name of a user placing the request, a set of inputs, and a set of outputs associated with the job; and
  calls a library to confirm that the user has access to a set of data the job will access.

4. The method defined in claim 2 wherein the set of modification hooks comprises a first modification hook and a second modification hook and the second modification hook is applied to an output of the first modification hook.

5. The method of claim 1, further comprising:
  receiving a call back from the launcher wrapper with information indicating the orchestration system job is running;
  receiving a heartbeat message from the launcher wrapper indicating the orchestration system job is running; and
  receiving one or more logs emitted by the job client.

6. The method defined in claim 1 wherein the job is an HTTP request.

7. The method defined in claim 1 wherein the cluster is a Hadoop cluster.

8. A system comprising:
  a network interface to receive a request for a proxy service;
  a memory to store instructions;
  one or more processors coupled to the memory and the network interface to execute the stored instructions to:
    receive, at the proxy service, a request to submit a job to a cluster, the request including a set of modification hooks;
    modify, by the proxy service, the request based on the modification hooks, the modifying comprising at least one of:
      a set of arguments associated with the job; or
      an execution environment associated with the job;
    send, by the proxy service, the request to an orchestration system;
    cause the orchestration system to launch an orchestration system job in a container on a job client server, wherein the job client server is separate from the cluster and the proxy service, the orchestration system job to start the job on the cluster, the orchestration system job comprising:
      a job client; and
      a launcher wrapper to launch the job client on the job client server;
    store, in a database under control of the proxy service, a job identifier associated with the job and a cluster identifier associated with the cluster;
    receive state information regarding the orchestration system job sent by the launcher wrapper to the proxy service for storage in the database with the job identifier associated with the job and the cluster identifier associated with the cluster;
    receive, by the proxy service, a kill request to terminate the job; and
    terminate, by the proxy service, the job using the job identifier stored in the database without proceeding through the orchestration system.

9. The system defined in claim 8 wherein the one or more processors are configured to:
    store, under control of the proxy service, job identification information to identify the job and at least one of status or log information regarding the job produced by the job client in the container; and
    enable access to at least one of status or log information regarding the job produced by the job client in the container.

10. The system defined in claim 8 wherein the network interface is operable to:
    receive a call back from the launcher wrapper with information indicating the orchestration system job is running;
    receive a heartbeat messages from the launcher wrapper indicating the orchestration system job is running; and
    receive one or more logs emitted by the job client.

11. The system defined in claim 8 wherein the one or more processors send the request to the orchestration system to launch the job by launching a container that encapsulates the job.

12. The system defined in claim 11 wherein the encapsulated job includes hooks for one or more operations for the cluster to perform.

13. The system defined in claim 8 wherein the request is an HTTP request.

14. The system defined in claim 8 wherein the cluster is a Hadoop cluster.

15. A non-transitory computer readable storage media comprising instructions stored thereupon which, when executed by a system having at least a processor and a memory therein, cause the system to perform operations comprising:
    receiving, at a proxy service, a request to submit a job to a cluster, the request including a set of modification hooks;
    modifying, by the proxy service, the request based on the modification hooks, the modifying comprising at least one of:
      a set of arguments associated with the job; or
      an execution environment associated with the job;
    sending, by the proxy service, the request to an orchestration system;
    causing the orchestration system to launch an orchestration system job in a container on a job client server, wherein the job client server is separate from the cluster and the proxy service, the orchestration system job to start the job on the cluster, the orchestration system job comprising:
      a job client; and
      a launcher wrapper to launch the job client on the job client server;
    storing, in a database under control of the proxy service, a job identifier associated with the job and a cluster identifier associated with the cluster;
    receiving state information regarding the orchestration system job sent by the launcher wrapper to the proxy service for storage in the database with the job identifier associated with the job and the cluster identifier associated with the cluster;
    receiving, by the proxy service, a kill request to terminate the job; and
    terminating, by the proxy service, the job using the job identifier stored in the database without proceeding through the orchestration system.

16. The non-transitory computer readable storage media defined in claim 15 wherein the operations further comprise:
    storing, under control of the proxy service, job identification information to identify the job and at least one of status and log information regarding the job produced by the job client in the container; and enabling access to at least one of status or log information regarding the job produced by the job client in the container.

17. The non-transitory computer readable storage media defined in claim 15 wherein the operations further comprise:

receiving a call back from the launcher wrapper with information indicating the orchestration system job is running;

receiving a heartbeat messages from the launcher wrapper indicating the orchestration system job is running; and receiving one or more logs emitted by the job client.

18. The non-transitory computer readable storage media defined in claim 15 wherein sending the request to the orchestration system to launch the orchestration system job comprises launching a container that encapsulates the orchestration system job.

19. The non-transitory computer readable storage media defined in claim 15 wherein the set of modification hooks comprises a first modification hook and a second modification hook and the second modification hook is applied to an output of the first modification hook.

20. The non-transitory computer readable storage media defined in claim 15 wherein one of the set of modification hooks is an access control hook, wherein the access control hook:

obtains a name of a user placing the request, a set of inputs, and a set of outputs associated with a job; and calls a library to confirm that the user has access to a set of data the job will access.

* * * * *